Feb. 9, 1960

A. CRIPPS 2,924,326

CONVEYORS

Filed March 6, 1958

Inventor
Alan Cripps
by Stevens, Davis, Miller & Mosher
his attorneys

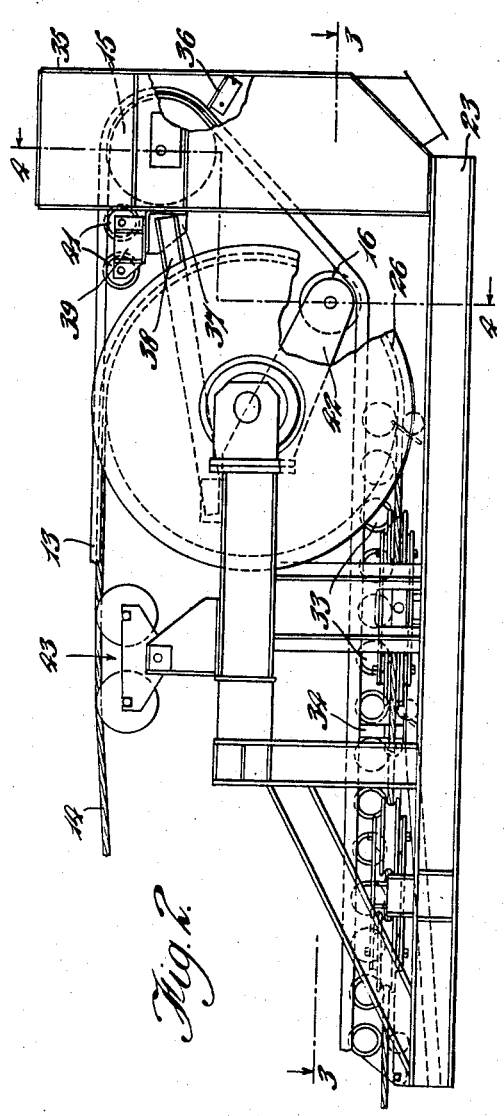

Feb. 9, 1960 A. CRIPPS 2,924,326
CONVEYORS
Filed March 6, 1958 3 Sheets-Sheet 3
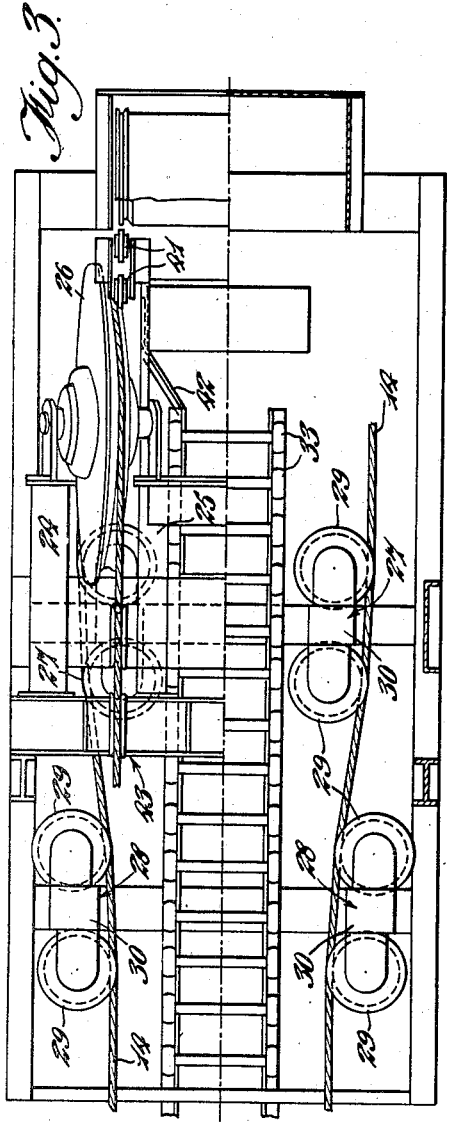
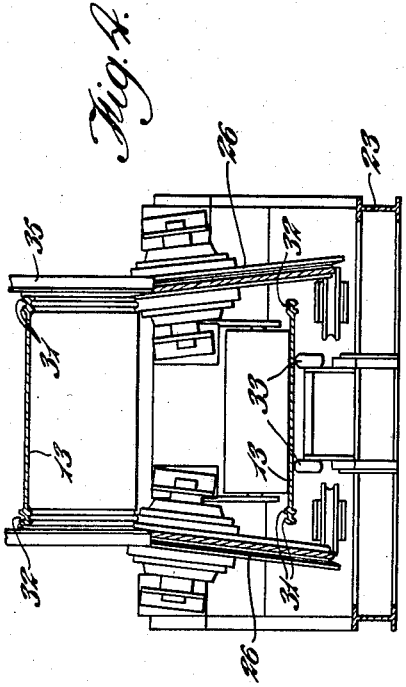

United States Patent Office

2,924,326
Patented Feb. 9, 1960

2,924,326

CONVEYORS

Alan Cripps, Inverness, Scotland, assignor to Cable Belt Limited, Inverness, Scotland Application March 6, 1958, Serial No. 719,610

Claims priority, application Great Britain March 25, 1957

2 Claims. (Cl. 198—191)

This invention relates to conveyors of the kind in which a carrying belt is supported and driven by cables forming a pair of circuits each lying substantially in a vertical plane adjacent one edge of the belt, the belt being provided at or adjacent each edge with cable engaging members adapted to rest on the ropes in the manner of a saddle on the back of a horse, the cable-engaging members being double-sided so that the belt can be similarly engaged with the cables on both the carrying and return runs of the conveyor, the belt being led away from and back into engagement with the cables at each end of the conveyor to enable the relation between the belt and the cables to be reversed.

It is usual practice to arrange the driving units for such conveyors beyond the discharge point or head end of the conveyor, the incoming cables which support the carrying run of the belt being deflected outwardly after disengaging the belt, to pass the bight in the latter and extend to the driving unit from which they return to pick up the return run of the belt, being deflected inwardly either at the driving unit or between the said unit and the bight in the belt, to pick up the said return run.

In some installations however, it is inconvenient or impossible, for example due to lack of space, to place the driving unit in this position, and the driving unit is then placed within the length of the conveyor adjacent the head end, at the tail end, or at an intermediate point in the conveyor. The object of the present invention is to provide a head unit suitable for a conveyor in which the drive unit is arranged at some point other than beyond the head end of the conveyor.

According to the invention, in a head unit for a conveyor of the kind referred to, the cables are reversed at the head end of the conveyor by passing around pulleys mounted inside the bight formed by the belt at that end of the conveyor, the belt being supported beyond the said pulleys by a discharge drum, and the cables being deflected outwardly and then inwardly after separating from the belt at the upper sides of said pulleys to pass the edges of the return run of the belt.

Further according to the invention, in a head unit for a conveyor of the kind referred to, the incoming cable runs at the head end of the conveyor are led without lateral deflection on to the upper sides of a pair of pulleys which are skewed outwardly towards their lower sides, the outgoing cable runs, after leaving the skewed pulleys, being deflected inwardly by guide pulleys to return them to the line of travel of the cable-engaging members on the belt, the incoming run of the belt being led away from the cables at the upper sides of the skewed pulleys, over a discharge drum and between the lower parts of the skewed pulleys, the outgoing run of the belt being supported independently of the cables to a point beyond that at which the outgoing cables are returned to the line of travel of the cable engaging means.

The independent supporting means for the outgoing run of the belt preferably comprises pairs of rollers.

The invention is hereinafter described with reference to the accompanying drawings, in which:

Figure 2 is a side elevation, on a larger scale, of the head unit of the conveyor shown in Figure 1, some parts being broken away;

Figure 3 is a plan view of the head unit shown in Figure 2, the lower part of the figure being in section on the line 3—3 of Figure 2; and Figure 4 is a sectional end view on the line 4—4 of Figure 2.

Figure 1:
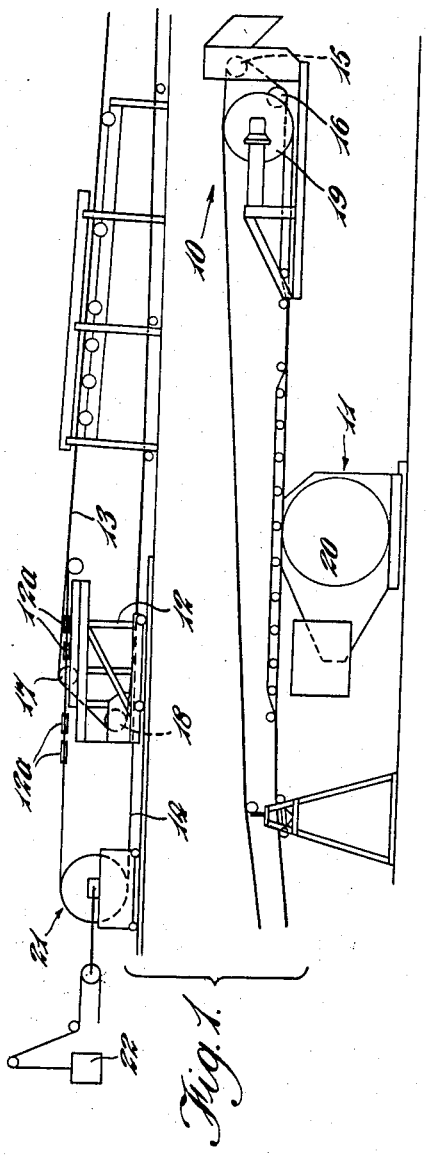
Figure 1 is a diagrammatic side elevation of a conveyor embodying the invention.

Referring to the drawings, and more particularly to Figure 1 thereof, the conveyor includes a head unit 10, a driving unit 11 positioned inside the length of the conveyor near the head end, a belt tension carriage 12, a belt 13, and cables, one of which is shown at 14, forming loops one on each side of the belt to support the edges of the latter. The belt passes around drums 15 and 16 on the head unit 10 and around drums 17 and 18 on the belt tension carriage 12, whereas the cables 14 pass around pulleys 19 on the head unit 10 and extend beyond the belt tension carriage 12 to the tension bogies 21, the latter being pulled outwardly away from the belt tension carriage to tension the cables by a suspended weight 22. The driving unit 11 includes an electric motor (not shown) driving, through a differential gear, two surge wheels, one of which is shown at 20, the return run of each cable making several turns around the appropriate surge wheel. The lateral displacement of the cables due to the several turns thereof about the surge wheels is corrected by guide pulleys mounted on vertical axes and deflecting the cables, after they leave the surge wheels, back to their normal spacing, the belt being supported, where it passes over the driving unit, by rollers which maintain it out of engagement with the cables. The belt tension carriage 12 is pulled away from the head end by the load of another suspended weight, not shown, to apply tension to the belt 13. Means such as guide pulley 12a are provided to deflect the upper runs of the cables outwardly past the edges of the belt at the belt tension carriage. The belt is supported by the cables, on both its upper and lower runs, between the belt tension carriage 12 and the head unit 10 and has frictional engagement with the cables to enable it to be driven thereby. The upper or carrying run of the belt travels towards the head unit 10, the belt being loaded adjacent the belt tension carriage 12 and discharging its load at the head unit 10.

Referring to Figures 2, 3 and 4, the head unit comprises a frame consisting of a base 23 supporting two pairs of longitudinally extending cantilever arms, one pair of which is shown in Figure 3 at 24, 25. Between each pair of cantilever arms there is mounted for rotation a pulley 26, the axis of which is skewed so that the lower sides of the pulleys are wider apart than their upper sides. On the base 23 are mounted four sets of guide pulleys 27, 27, 28, 28, each set comprising two pulleys 29, 29 one at each end of a beam 30 the pulleys being rotatable about vertical axes. Each of the cables 14 has its incoming portion led without lateral deflection on to the upper side of one of the pulleys 26, and passes round the pulley so that it is deflected outwardly before leaving the said pulley. After leaving the pulley 26, each cable passes over the outer sides of the pulleys 29 of a pulley set 27 and then over the inner sides of the pulleys 29 of a pulley set 28, the cable being thus deflected back into the vertical plane which contains the incoming portion of the said cable.

The belt 13, as shown in Figure 4 has on each side, along its edges, pairs of longitudinally extending ribs 31, 31, each pair defining between them a groove 32 of truncated V-shape in cross-section. Where the belt 13 is resting on the cables 14, the cables lie in the grooves 32 on the underside of the belt, and are frictionally gripped between the sides of the grooves. The belt is stiffened transversely by resilient metal strips embedded therein, so that it is able to take up a troughed form under load.

The run of the belt 13 travelling towards the head unit is supported on the cables 14 up to the point where the latter are deflected downwardly around the pulleys 26, the belt continuing without substantial vertical deflection on to the discharge drum 15 around which it is deflected to a downward and rearward direction. The belt then passes under the drum 16 and runs on to a series of pairs of supporting rollers 33 mounted on a carriage 34 which is mounted on the base 23. These rollers 33 extend to a point, on the side of the pulley sets 28 remote from the pulleys 26, where the cables 14 have returned to their normal belt-supporting spacing, and the belt, after passing over the last pair of rollers, drops on to the cables so as to be supported thereby on the return run.

The discharge drum 15 is mounted in bearings carried by two wall members 35, 35 enclosing the sides of the conveyor in the region of the said drum, a deflector plate 36 being mounted between the said wall members to throw outwardly material carried over the drum 15 by the belt 13. A beam 37 connecting the wall members 35, 35 has connected to it struts 38 which are secured at their other ends to the cantilever arms 25 and thus assist to support the wall members 35, 35. The beam 37 carries brackets 39 to support pairs of discs 41, 41 one at each edge of the belt, which discs engage in the grooves 32 and support the belt between the pulleys 26 and the drum 15.

The drum 16 is carried by a pair of cranked arms 42, 42 extending downwardly in an inclined direction from the cantilever arms 25.

A set of idler pulleys 43 may be provided, as shown in Figure 2, to support each cable 14 where it approaches the upper part of the pulley 26.

The arrangement according to the invention provides for discharge of material carried by the conveyor at the extreme end thereof, no space being required beyond the discharge point for the driving unit.

I claim:
1. A conveyor comprising an endless carrying belt having opposing edges, cables supporting and driving the belt, said cables forming a pair of circuits and each including an upper and a lower run lying substantially in a vertical plane adjacent an edge of the belt means for driving said cables, longitudinally continuous cable-engaging members at each edge of said belt adapted to rest on said cables, said cable-engaging members being provided on both sides of the belt, and means at both ends of the conveyor for leading the belt away from and back into engagement with the cables whereby the relation of the belt and the cables is reversed and the belt rests on the cables on both the upper and lower runs of the said cables, said means at one end of the conveyor comprising, in combination, a frame, a discharging drum rotatably mounted in said frame and supporting the bight of the belt, a pair of pulleys mounted in said frame and skewed outwardly towards their sides, said pulleys being mounted inside the bight of the belt and leading the cables downwardly and outwardly away from said belt as it approaches the discharge drum, guide pulley means mounted in said frame to receive the return runs of the cables after the latter leave the skewed pulleys and deflect said return runs inwardly to return them to the lines of travel of the cable-engaging members on the return run of the belt, and belt-supporting rollers forming a series extending from a position between the lower portions of said skewed pulleys to a position on the further side of the guide pulleys to support the return run of the belt up to the position where the cables return to the line of travel of the cable-engaging members.

2. A conveyor as claimed in claim 1, wherein said frame includes cantilever arms extending longitudinally of the conveyor and said skewed pulleys are mounted on said cantilever arms.

References Cited in the file of this patent

UNITED STATES PATENTS

| | | |
|---|---|---|
| 1,970,842 | Crossen | Aug. 21, 1934 |
| 2,489,440 | Vallance | Nov. 29, 1949 |
| 2,751,065 | Thomson | June 19, 1956 |